(12) United States Patent
        Kwon

(10) Patent No.: US 12,572,052 B2
(45) Date of Patent: Mar. 10, 2026

(54) APERTURE MODULE AND CAMERA MODULE INCLUDING THE SAME

(71) Applicant: SAMSUNG ELECTRO-MECHANICS CO., LTD., Suwon-si (KR)

(72) Inventor: Young Hwan Kwon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 79 days.

(21) Appl. No.: 18/491,945

(22) Filed: Oct. 23, 2023

(65) Prior Publication Data

US 2024/0419054 A1     Dec. 19, 2024

(30) Foreign Application Priority Data

Jun. 14, 2023     (KR) ......................... 10-2023-0075899

(51) Int. Cl.
*G03B 9/06*          (2021.01)
*G03B 9/22*          (2021.01)
*H04N 23/55*         (2023.01)

(52) U.S. Cl.
CPC ................. *G03B 9/06* (2013.01); *G03B 9/22* (2013.01); *H04N 23/55* (2023.01); *G03B 2207/005* (2013.01)

(58) Field of Classification Search
CPC ...................................................... G02B 5/005
See application file for complete search history.

(56) References Cited

U.S. PATENT DOCUMENTS

| | | | | |
|---|---|---|---|---|
| 2007/0097528 A1* | 5/2007 | Hagiwara | .............. | G02B 26/00 |
| | | | | 359/819 |
| 2012/0076486 A1 | 3/2012 | Bai et al. | | |
| 2014/0079380 A1* | 3/2014 | Taguchi | ................... | G03B 7/20 |
| | | | | 396/63 |
| 2018/0180971 A1* | 6/2018 | Yoshizawa | ............... | G03B 9/06 |

(Continued)

FOREIGN PATENT DOCUMENTS

| | | |
|---|---|---|
| KR | 10-0947285 B1 | 3/2010 |
| KR | 10-2012-0032433 A | 4/2012 |

(Continued)

OTHER PUBLICATIONS

Korean Office Action issued on Aug. 5, 2025, in corresponding Korean Patent Application No. 10-2023-0075899. (7 pages in English, 6 pages in Korean).

*Primary Examiner* — Noam Reisner
(74) *Attorney, Agent, or Firm* — NSIP Law

(57)                    ABSTRACT

An aperture module is provided. The aperture module includes a blade unit including a plurality of blades configured to form an incidence hole through which light passes, the plurality of blades being provided in (2M−1) layers in an optical axis direction, the plurality of blades disposed in each layer being provided in (2N+1) members, where M and N are natural numbers, a rotator on which the plurality of blades are rotatably seated, and an aperture driver configured to rotate the rotator and change a size of the incidence hole. In the plurality of blades, blades disposed on different layers of the (2M−1) layers overlap at least partially in the optical axis direction, and blades disposed on a same layer of the (2M−1) layers do not overlap each other in the optical axis direction.

14 Claims, 12 Drawing Sheets

(56)                    References Cited

U.S. PATENT DOCUMENTS

| 2020/0012170 | A1 |   | 1/2020 | Hong et al. |   |
|---|---|---|---|---|---|
| 2020/0064711 | A1 | * | 2/2020 | Kim et al. |   |
| 2020/0241387 | A1 | * | 7/2020 | Seo | G03B 13/36 |
| 2023/0273504 | A1 | * | 8/2023 | Chen | G03B 30/00 |
|   |   |   |   |   | 396/510 |
| 2024/0061317 | A1 | * | 2/2024 | You | G03B 3/10 |

FOREIGN PATENT DOCUMENTS

| KR | 10-2015-0069740 | A | 6/2015 |
|---|---|---|---|
| KR | 10-2020-0004513 | A | 1/2020 |
| KR | 10-2139767 | B1 | 7/2020 |
| KR | 10-2185053 | B1 | 12/2020 |

* cited by examiner

I–I'

II–II'

APERTURE MODULE AND CAMERA MODULE INCLUDING THE SAME

CROSS-REFERENCE TO RELATED APPLICATIONS

This application claims the benefit under 35 USC § 119(a) of Korean Patent Application No. 10-2023-0075899 filed on Jun. 14, 2023, in the Korean Intellectual Property Office, the entire disclosure of which is incorporated herein by reference for all purposes.

BACKGROUND

1. Field

The following description relates to an aperture module and a camera module including the same.

2. Description of the Background

Camera modules are being implemented in portable electronic devices such as, but not limited to, smartphones.

In typical digital cameras, a mechanical aperture may be provided to change the amount of light incident in the lens based on an image capturing environment. However, in the example of camera modules that are implemented in miniature devices such as portable electronic devices, it may be difficult to separately provide an aperture.

For example, the weight of the camera module may increase due to various parts that drive the aperture, and thus an autofocus or optical image stabilization (OIS) operation may deteriorate. It may be beneficial to improve image quality while significantly reducing the increase in the thickness of portable electronic devices due to the aperture.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an aperture module includes a blade unit comprising a plurality of blades configured to form an incidence hole through which light passes, the plurality of blades being provided in (2M−1) layers in an optical axis direction, the plurality of blades disposed in each layer being provided in (2N+1) members, where M and N are natural numbers other than 0; a rotator on which the plurality of blades are rotatably seated; and an aperture driver configured to rotate the rotator and change a size of the incidence hole, wherein in the plurality of blades, blades disposed on different layers of the (2M−1) layers overlap at least partially in the optical axis direction, while blades disposed on a same layer of the (2M−1) layers do not overlap each other in the optical axis direction.

As the rotator rotates and the size of the incidence hole increases, an overlapping area between the blades disposed on the different layers of the (2M−1) layers may increase, and as the size of the incidence hole decreases, the overlapping area between the blades disposed on different layers of the (2M−1) layers may be reduced.

The incidence hole formed by the plurality of blades may have an odd number of angles.

The aperture module may further include a base on which the rotator is seated; a ball member disposed between the rotator and the base, and configured to rotatably support the rotator; and a rolling groove that extends in a direction of rotation of the rotator, and accommodates the ball member in a rolling motion, wherein the rolling grooves are disposed to face each other in the optical axis direction in the rotator and the base.

The ball member may include a main ball member, and the rolling groove may include a main rolling groove that is in contact with the main ball member at four points.

The main rolling groove comprises a first main rolling groove provided in the rotator and a second main rolling groove provided in the base to face the first main rolling groove, and the first main rolling groove and the second main rolling groove may be spaced apart from each other at a predetermined angle based on an axis parallel to the optical axis direction, and the main ball member contacts each of the first main rolling groove and the second main rolling groove at two points.

The first main rolling groove and the second main rolling groove may each be provided in a "V" shape.

The ball member may include a sub-ball member, and the rolling groove may include a sub rolling groove provided to contact the sub-ball member in at least two points, wherein a length of the sub rolling groove in a radial direction may be greater than a diameter of the sub-ball member such that the sub-ball member is movable in the radial direction.

The sub-rolling groove may include a first sub-rolling groove provided on the rotator and a second sub-rolling groove provided on the base to face the first sub-rolling groove, and the sub-ball member may contact each of the first sub-rolling groove and the second sub-rolling groove at one point on an axis parallel to the optical axis direction.

The sub-ball member may further contact at one point with at least one of the first sub-rolling groove and the second sub-rolling groove on an axis parallel to a direction perpendicular to the optical axis direction.

The aperture module may further include a base on which the rotator is rotatably seated, wherein the aperture driver may further include an aperture magnet provided on the rotator to face the base; and an aperture coil disposed on the base to face the aperture magnet, wherein the aperture magnet is provided as a plurality of aperture magnets disposed in a circumferential direction based on a center of the incidence hole.

The aperture magnet may be provided below the rotator, and may be disposed between the rotator and the base, based on the optical axis direction.

The aperture magnet may be provided on an outer circumferential surface of the rotator, and may be disposed between the rotator and the base, based on a direction perpendicular to the optical axis direction.

In a general aspect, a camera module includes a housing; a lens barrel provided inside the housing and having a plurality of lenses disposed therein; and an aperture module configured to control an amount of light incident on the lenses, wherein the aperture module includes a blade unit comprising a plurality of blades configured to form an incidence hole through which light passes, the plurality of blades being provided in (2M−1) layers in an optical axis direction, the plurality of blades disposed in each layer being provided in (2N+1) members, where M and N are natural numbers; a rotator on which the plurality of blades are rotatably seated; an aperture driver configured to change a size of the incidence hole by rotating the rotator; and a controller configured to control the aperture driver and adjust the size of the incidence hole, wherein in the blade unit, blades disposed on different layers of the (2M−1) layers overlap at least partially in the optical axis direction, and blades disposed on a same layer of the (2M−1) layers do not overlap each other in the optical axis direction, and wherein the aperture module has a fixed relative position in the optical axis direction with respect to the housing.

The camera module may further include an autofocus unit accommodated in relative motion in the optical axis direction with respect to the housing and the aperture module and having the lens barrel disposed therein, wherein the controller may increase the size of the incidence hole when the autofocus unit moves upward with respect to the optical axis direction, and may reduce the size of the incidence hole when the autofocus unit moves downward with respect to the optical axis direction.

The camera module may further include a fall detection sensor configured to measure an acceleration and generate a fall signal when a fall of the camera module is detected, wherein the controller may be configured to open the incidence hole to a maximum size when the fall signal is generated.

Other features and examples will be apparent from the following detailed description, the drawings, and the claims.

Figure 1:
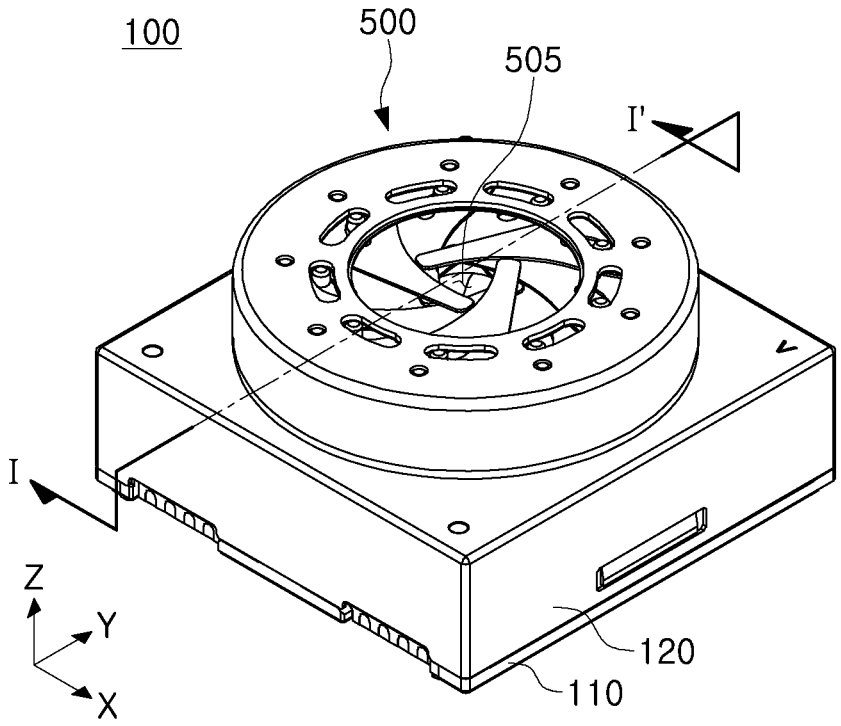
FIG. 1 illustrates a perspective view of an example camera module, in accordance with one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto. The use of the terms "example" or "embodiment" herein have a same meaning, e.g., the phrasing "in one example" has a same meaning as "in one embodiment", and "one or more examples" has a same meaning as "in one or more embodiments."

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

One or more examples may provide an aperture module in which image quality may be improved while significantly reducing an increase in thickness of an aperture, and a camera module including the same.

The example camera module, in accordance with one or more embodiments, may be mounted in an electronic device.

In a non-limited example, the camera module may be mounted on a portable terminal, a laptop computer, a virtual reality (VR) device, glasses or the like. However, the example electronic devices in which the camera module may be mounted are not limited to the aforementioned devices. In an example, the camera module may be mounted on any portable electronic device such as, but not limited to, a portable game machine or the like.

An example camera module, in accordance with one or more embodiments, may include a plurality of lens modules. For example, the camera module may include a first lens module and a second lens module configured to be movable in an optical axis direction. Additionally, the camera module may further include a housing configured to accommodate the first lens module and the second lens module.

The camera module may be configured to significantly reduce shaking of the first lens module and the second lens module due to external impact. For example, the camera module may include a device that fixes the positions of the first lens module and the second lens module (in a non-driving state). As a detailed example, the camera module may include a magnet and a yoke member. The magnet may be disposed on the first lens module, and the yoke member may be disposed on the second lens module and the housing. The magnet may be disposed on the first yoke member disposed in the housing and the second yoke member disposed in the housing, and thus, in the non-driving state of the lens module, the position of the first lens module relative to the housing and the relative position of the second lens module relative to the first lens module may always be maintained constant.

The camera module configured as above may drive a plurality of lens modules in the direction of the optical axis to increase the focal displacement width, while significantly reducing fluctuations of the lens modules due to external impact.

Hereinafter, embodiments will be described in detail based on the accompanying drawings.

Figure 2:
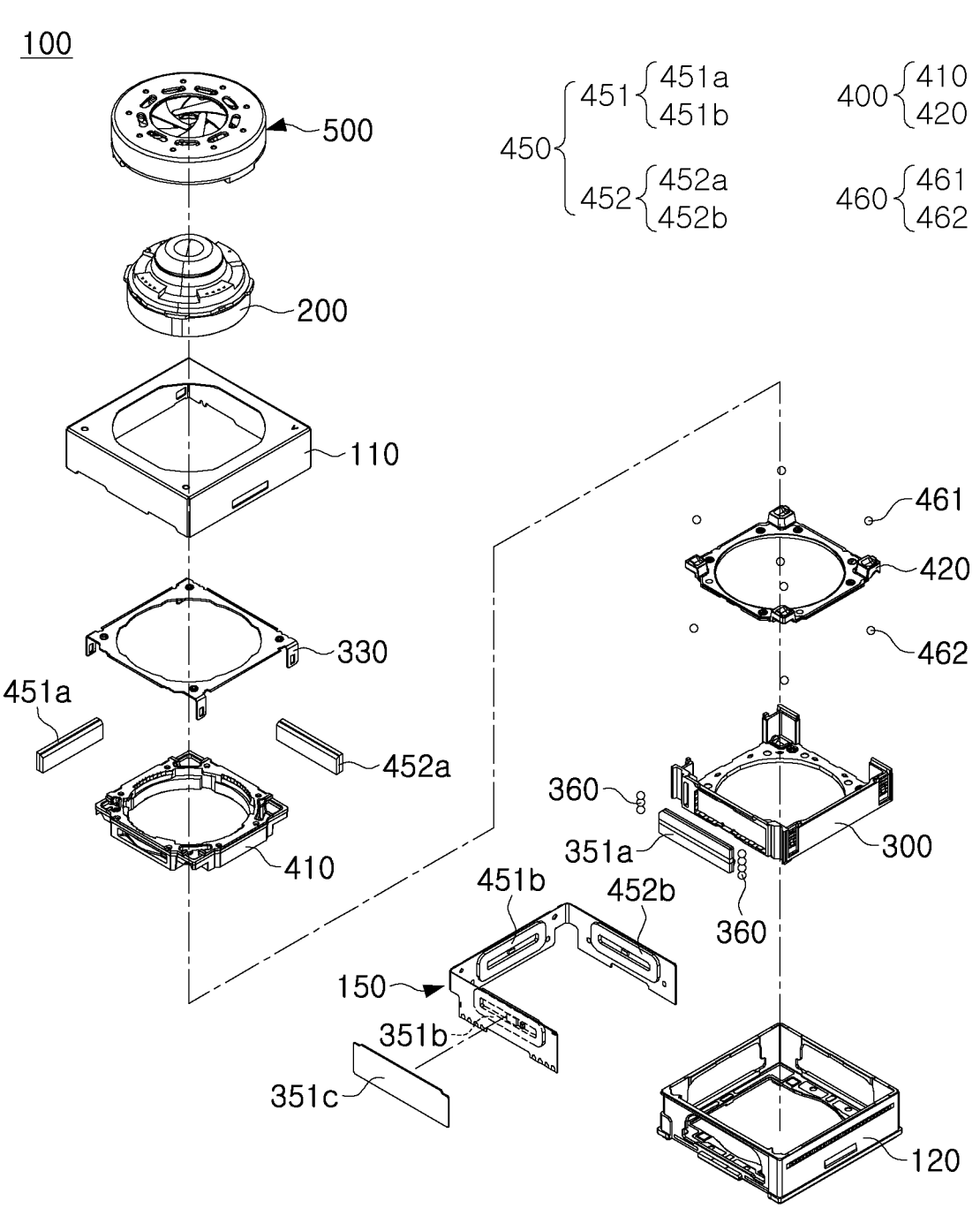
FIG. 2 illustrates an exploded perspective view of an example camera module, in accordance with one or more embodiments.
Figure 3:
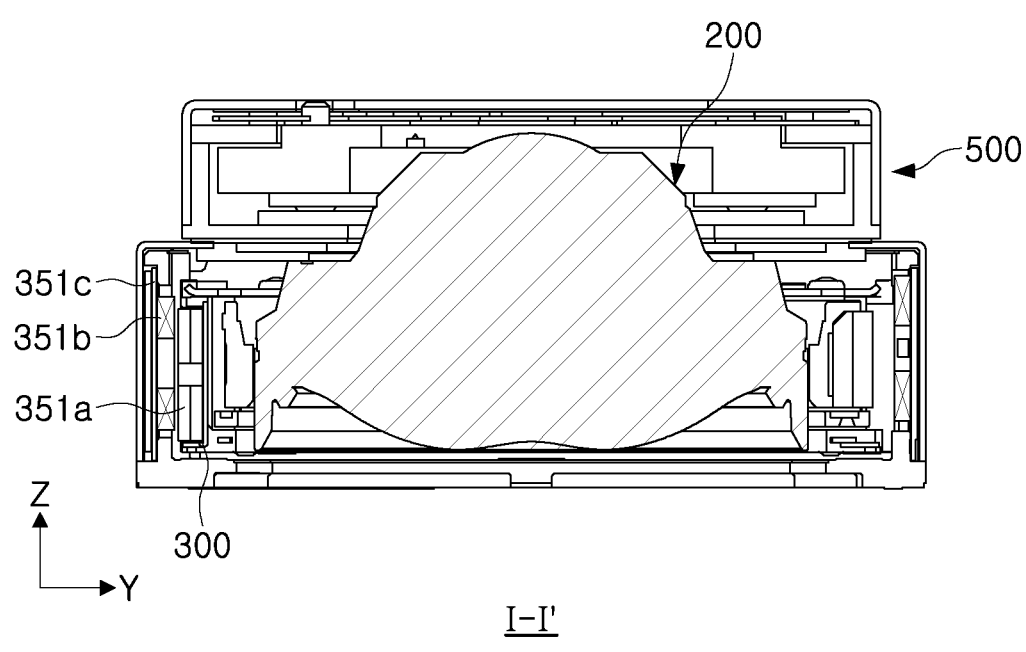
FIG. 3 illustrates a cross-sectional view taken along line I-I' of FIG. 1.

FIG. 1 is a perspective view of an example camera module, in accordance with one or more embodiments, FIG. 2 is an exploded perspective view of an example camera module, in accordance with one or more embodiments, and FIG. 3 is a cross-sectional view taken along line I-I' of FIG. 1.

Referring to FIGS. 1 and 2 together, an example camera module 100, according to an embodiment, may include a housing 110, a lens barrel 200 in which a plurality of lenses (not illustrated) are disposed, an image stabilization unit 400 that accommodates the lens module 200 and is movable in a first direction perpendicular to the optical axis, an autofocus unit 300 accommodating the lens module 200 and the image stabilization unit 400 and accommodated in the housing to be movable in the optical axis direction (Z-axis direction), a case 120 covering a housing 110, and an aperture module 500 that adjusts the amount of incident light incident on the lens barrel 200. Additionally, a carrier cover 330 provided between the case 120 and the autofocus unit 300 may be further included to cover the autofocus unit 300 from an upper portion in the optical axis direction.

The lens barrel 200 may accommodate a plurality of lenses (not illustrated) to capture an image of a subject therein, and the plurality of lenses may be arranged along an optical axis (Z-axis) inside the lens barrel 200 and mounted in the lens barrel 200. The plurality of lenses may be disposed as many as necessary according to the implementation of the lens barrel 200, and respective lenses may have optical properties, for example, the same or different refractive indexes.

The lens barrel 200 may be accommodated in the image stabilization unit 400 based on the optical axis direction, and the image stabilization unit 400 may be accommodated in the autofocus unit 300, and the autofocus unit 300 may be sequentially accommodated in the housing 110.

The housing 110 may have an approximate box shape with an open top, and the autofocus unit 300 may be movably provided in an internal space of the housing in an optical axis direction. The image stabilization unit 400 may be movably accommodated in the autofocus unit 300 in a direction perpendicular to the optical axis direction. The lens barrel 200 may be accommodated and mounted in the image stabilization unit 400.

The lens barrel 200 may be configured to be movable along with the autofocus unit 300 in an optical axis direction, to perform a focusing operation. A focusing driver to be described later may move the autofocus unit 300 in the optical axis direction, and at this time, the lens barrel 200 accommodated in the autofocus unit 300 may also move in the optical axis direction.

Additionally, the lens barrel 200 may be configured to be movable together with the image stabilization unit 400 in a first direction perpendicular to the optical axis and in a second direction, perpendicular to the optical axis and the first direction, to correct a user's hand-shake. In an example, the lens barrel 200 may move in the first direction and the second direction together with the image stabilization unit 400 based on a shake correction driver 450 to be described later.

On the other hand, in an example, the camera module 100 may include an image sensor (not illustrated) that converts light incident through the lens barrel 200 into an electrical signal.

The image sensor is a device that converts light incident through the lens barrel 200 into an electrical signal, and for example, may be a Charge Coupled Device (CCD) or a Complementary Metal-Oxide Semiconductor (CMOS).

The electrical signal converted by the image sensor may be output as an image through a display of a portable device.

In an example, the image sensor may be mounted on a substrate 150, and may be disposed below the housing 110 in the optical axis direction.

Referring to FIG. 3, the focusing driver may include a focusing magnet 351a and a focusing coil 351b that generate driving forces in an optical axis direction. Additionally, a position sensor (not illustrated), for example, a Hall sensor, may be provided to sense the position of the lens barrel 200 in the optical axis direction.

The focusing magnet 351a and the focusing coil 351b may be disposed to face each other. In an example, the focusing magnet 351a may be mounted on the autofocus unit 300, and the focusing coil 351b may be disposed on the housing 110 to face the focusing magnet.

Specifically, the focusing magnet 351a is disposed on one surface of the autofocus unit 300, and the focusing coil 351b and the position sensor may be provided on the substrate 150 mounted on the housing 110 and disposed on one surface of the housing 110 facing the one surface of the autofocus unit 300.

In the above structure, based on the optical axis direction, the focusing magnet 351b is a moving member that moves together with the autofocus unit 300, and the focusing coil 351b may be referred to as a fixed member that is fixed to the housing and does not move with the autofocus unit 300.

However, the mounting positions of the focusing magnet 351a and the focusing coil 351b are not particularly limited as long as they have any structure generating electromagnetic influence to drive the autofocus unit 300 in the direction of the optical axis.

When power is applied to the focusing coil 351b, the autofocus unit 300 may be moved in the optical axis direction by electromagnetic influence between the focusing magnet 351a and the focusing coil 351b. At this time, the position sensor may sense the optical axis direction position of the autofocus unit 300.

The autofocus unit 300 may include a carrier 310 in which the lens barrel 200 is accommodated, and a carrier cover 320 covering the carrier 310 at an upper portion in the optical axis direction.

Since the autofocus unit 300 accommodates the lens barrel 200, when the autofocus unit 300 is moved in the optical axis direction by the focusing driver, the lens barrel 200 also moves in the optical axis direction.

Additionally, according to an embodiment, since the lens barrel 200 is accommodated in the image stabilization unit 400 and the autofocus unit 300 accommodates the lens barrel 200 and the image stabilization unit 400 together, when the autofocus unit 300 moves in the direction of the optical axis, the lens barrel 200 and the image stabilization unit 400 also move in the direction of the optical axis.

In an example, when the focusing driver operates, the autofocus unit 300, the image stabilization unit 400, the lens barrel 200, and the aperture module 500 may also move in the direction of the optical axis.

On the other hand, when the autofocus unit 300 moves, a focusing rolling member 360 is disposed between the autofocus unit 300 and the housing 110 to reduce friction therebetween. The focusing rolling member 360 may be a ball bearing in the form of a ball.

The focusing rolling member 360 may be disposed between the autofocus unit 300 and the housing 110 on both sides of the focusing magnet 351a (or the focusing coil 351b), and may thus support the movement of the autofocus unit 300 in the direction of the optical axis with respect to the housing 110 and reduce the frictional force generated during movement.

Additionally, a focusing yoke 351c may be mounted on the substrate 150. In an example, the focusing yoke 351c may be disposed to face the focusing magnet 351a with the focusing coil 351b interposed therebetween.

Since an attractive force acts in a direction perpendicular to the optical axis direction between the focusing yoke 351c and the focusing magnet 351a, the focusing rolling member 360 may maintain contact with the autofocus unit 300 and the housing 110 based on the attractive force between the focusing yoke 351c and the focusing magnet 351a.

Additionally, the focusing yoke 351c may also operate to focus the magnetic force of the focusing magnet 351a. Accordingly, leakage magnetic flux may be prevented from occurring. For example, the yoke and the focusing magnet 351a may form a magnetic circuit.

On the other hand, as described above, to compensate for image shake caused by factors such as a user's hand-shake or the like, the lens barrel 200 may move in a first direction perpendicular to the optical axis and in a second direction perpendicular to the optical axis and the first direction.

For example, when shaking occurs due to shaking of the user's hand during an image capture operation, the image stabilization unit 400 compensates (offsets or corrects) for shaking by providing a relative displacement corresponding to the shaking to the lens barrel 200.

The image stabilization unit 400 accommodates the lens barrel 200. The image stabilization unit 400 in which the lens barrel 200 is accommodated may be accommodated in the autofocus unit 300 at an upper portion in the optical axis direction. The image stabilization unit 400 may move relative to the autofocus unit 300 in the first direction and the second direction based on a shake correction driver 450 to be described later.

For example, the image stabilization unit 400 may be accommodated in the autofocus unit 300, and may move in the first direction and the second direction together with the lens barrel 200.

In an example, the image stabilization unit 400 may include a lens holder 410 that accommodates the lens barrel 200 and moves relative to the autofocus unit 300 together with the lens barrel 200 in a first direction, and a holder frame 420 that moves relative to the lens holder 410 and the autofocus unit 300 in the second direction with respect to the lens barrel 200.

The lens holder 410 may be driven by a shake correction driver 450, and specifically, a first shake correction driver 451 to be described later, and may move relatively to the holder frame 420 and the autofocus unit 300 in the first direction, together with the lens barrel 200.

The holder frame 420 may be driven by the shake correction driver 450, specifically, a second shake correction driver 452 to be described later, and may move relatively to the lens holder 410 and the autofocus unit 300 in the second direction, together with the lens barrel 200.

The shake correction driver 450 may be provided in plurality to generate driving forces in different directions to perform shake correction. In an example, the shake correction driver 450 may include a first shake correction driver 451 that generates driving forces in a first direction and a second shake correction driver 452 that generates driving forces in a second direction.

The lens holder 410 may move in a first direction based on the first shake correction driver 451, and the holder frame 420 may move in a second direction based on the second shake correction driver 452.

The first and second shake correction drivers 451 and 452 may include first and second shake correction magnets 451*a* and 452*a* and first and second shake correction coils 451*b* and 452*b*, respectively. Additionally, each of the first and second shake correction drivers 451 and 452 may include a position sensor (not illustrated), for example, a hall sensor.

The first and second shake correction magnets 451*a* and 452*a* may be disposed to face the first and second shake correction coils 451*b* and 452*b*, respectively.

In an example, the first and second shake correction magnets 451*a* and 452*a* may be mounted on the image stabilization unit 400, and the first and second shake correction coils 451*b* and 452*b* may be provided on the substrate 150 mounted on the housing 110, and may be mounted on the housing 110 in positions facing the respective first and second shake correction magnets 451*a* and 452*a*, respectively.

In this structure, based on the direction perpendicular to the optical axis, the first or second shake correction magnets 451*a* and 452*b* are moving members that move in a first direction or a second direction together with the lens barrel 200, and the first or second shake correction coils 451*b* and 452*b* may be fixed members fixed to the housing 110.

However, the mounting positions of the first and second shake correction magnets 451*a* and 452*a* and the first and second shake correction coils 452*a* and 452*b* are not limited to the above position, as long as the structure generates electromagnetic influence to drive the image stabilization unit 400 in the first and second directions.

When power is applied to the first shake correction coil 451*b*, the lens holder 410, for example, the image stabilization unit 400 may be moved in the first direction by electromagnetic influence between the first shake correction magnet 451*a* and the first shake correction coil 451*b*. At this time, the position sensor may sense the position of the image stabilization unit in the first direction.

Similarly, when power is applied to the second shake correction coil 452*b*, the holder frame 420 of the image stabilization unit 400 may be moved in the second direction based on an electromagnetic influence between the second shake correction magnet 452*a* and the second shake correction coil 452*b*. At this time, the position sensor may sense the position of the image stabilization unit 400 in the second direction.

Since the lens barrel 200 may be mounted on the image stabilization unit 400, when the image stabilization unit 400 moves in the first and second directions, the lens barrel 200 may also move in the first direction and the second direction. At this time, since the image stabilization unit 400 may be accommodated in the autofocus unit 300, the image stabilization unit 400 and the lens barrel 200 mounted therein may move relative to the autofocus unit 300 in the first direction and the second direction.

In an example, by this structure, the image stabilization unit 400 may move relative to the autofocus unit 300 along with the lens barrel 200 in the first and second directions, and thus, shaking caused by the user's hand-shake or the like may be offset.

Additionally, when the image stabilization unit 400 moves, a shake correction rolling member 460 may be disposed between the image stabilization unit 400 and the autofocus unit 300 to reduce friction therebetween. The shake correction rolling member 460 may be a ball bearing in the form of a ball.

The shake correction rolling member 460 may include a first shake correction rolling member 461, disposed between the lens holder 410 and the holder frame 420 to reduce friction when moving in a first direction and guide in the first direction, and a second shake correction rolling member 462, disposed between the holder frame 420 and the autofocus unit 300 to reduce friction when moving in the second direction and guide in the second direction.

A printed circuit board on which an image sensor is mounted may be disposed below the housing 110.

The case 120 may be coupled to surround the outer surface of the housing 110 and may protect internal components of the camera module. The case 120 may be combined with the housing 110 to surround the outer surface of the housing 110, and may protect internal components of the camera module.

In an example, the case 120 may shield electromagnetic waves such that the electromagnetic waves generated from the camera module 100 do not affect other electronic components in the portable device.

Additionally, since the portable device may be equipped with various electronic components in addition to the camera module 10, the case 120 may shield the electromagnetic waves such that the electromagnetic waves generated from these electronic parts do not affect the camera module.

The case 120 may be formed of a metal material, and may be grounded to a ground pad provided on the printed circuit board. Accordingly, electromagnetic waves may be shielded.

Additionally, the camera module 100, in accordance with one or more embodiments, may include a controller (not illustrated) configured to adjust the size of the incidence hole of the aperture module 500. The controller may adjust the size of an incidence hole 505 by controlling the aperture driver 520 to be described later to rotate the blade 550.

The controller may adjust the size of the incidence hole 505 through a feedback circuit based on various data of the camera module 100 collected using a sensor or the like.

In an example, when a signal or occurrence in which an impact force is expected, such as a drop of the camera module 100 or the like, is detected, the controller may open the incidence hole 505 to the maximum to prevent the lens of the lens module 200 from contacting the blade 550 and being damaged.

Specifically, the camera module 100, in accordance with one or more embodiments, may further include a drop detection unit (not illustrated). The drop detection unit may include, as an example, a gyro sensor. In an example in which the camera module 100 is dropped, the drop detection unit measures the acceleration to determine that the camera module 100 is falling and generates a drop detection signal. The controller opens the incidence hole 505 to the maximum when a drop detection signal is generated from the drop detection unit, thereby preventing the lens of the lens module 200 and the blades 550 forming the incidence hole from contacting each other, and being damaged.

As another example, the controller may adjust the incidence hole 505 according to whether the autofocus unit 300 is movable or the position of the lens module 200 in the direction of the optical axis.

Specifically, in the camera module 100, in accordance with one or more embodiments, the aperture module 500 may be provided in the housing 110 or the case 120 so as not to move regardless of the movement of the autofocus unit 300 and the image stabilization unit 400.

When the autofocus unit 300 is operated and the lens module 200 moves upward in the optical axis direction, the light incident to the lens of the lens module 200 increases and the F value may change. Accordingly, the controller may enable the F value to be constant by enabling the incidence hole 505 to be reduced. Conversely, when the autofocus unit 300 is operated and the lens module 200 moves downwardly based on the optical axis direction, the amount of light incident to the lens is reduced. The F value may change due to the operation of the autofocus unit 300. Accordingly, the controller may enable the F value to be constant by increasing the size of the incidence hole 505.

On the other hand, the aperture module 500 is a device configured to selectively change the amount of light (incident amount) incident to the lens module 200.

Figure 4:
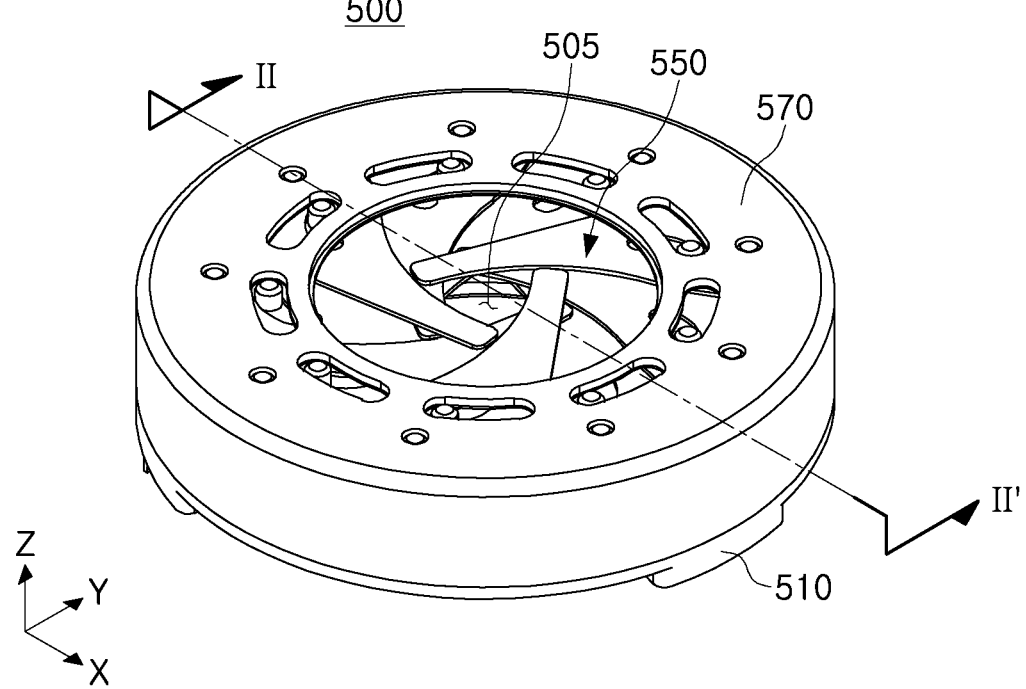
FIG. 4 illustrates a perspective view of an example aperture module, in accordance with one or more embodiments.

In an example, referring to FIG. 4, the aperture module 500 includes a plurality of blades 550 that are driven by the aperture driver 520, and may successively implement incidence holes 505 of different sizes. The user may select a size having an appropriate F value among various sizes of incidence holes 505 according to the shooting environment such that light is incident to the lens barrel 200.

Figure 5:
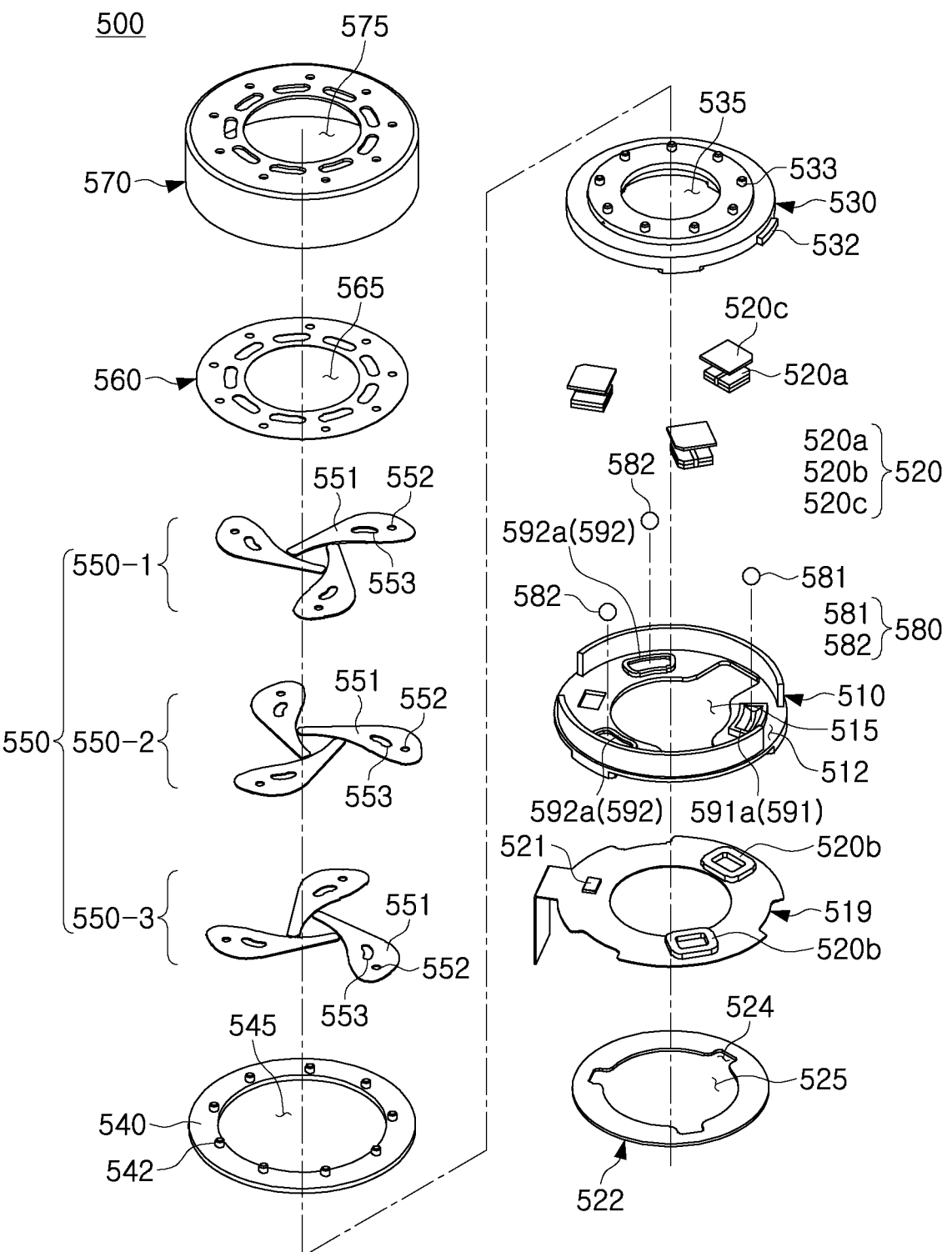
FIG. 5 illustrates an exploded perspective view of an example aperture module, in accordance with one or more embodiments.
Figure 6:
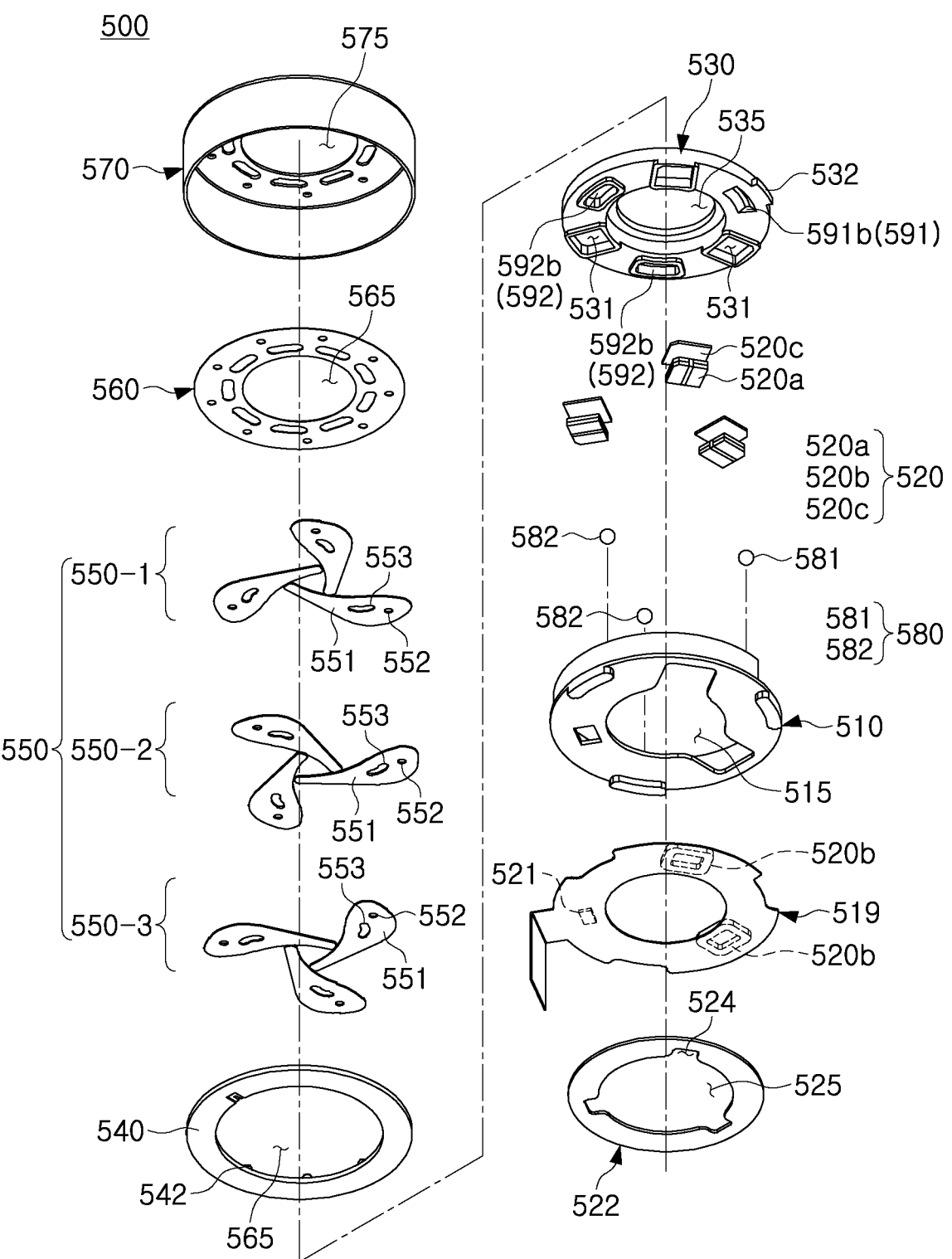
FIG. 6 illustrates an exploded perspective view of FIG. 5 viewed from another direction.
Figure 7:
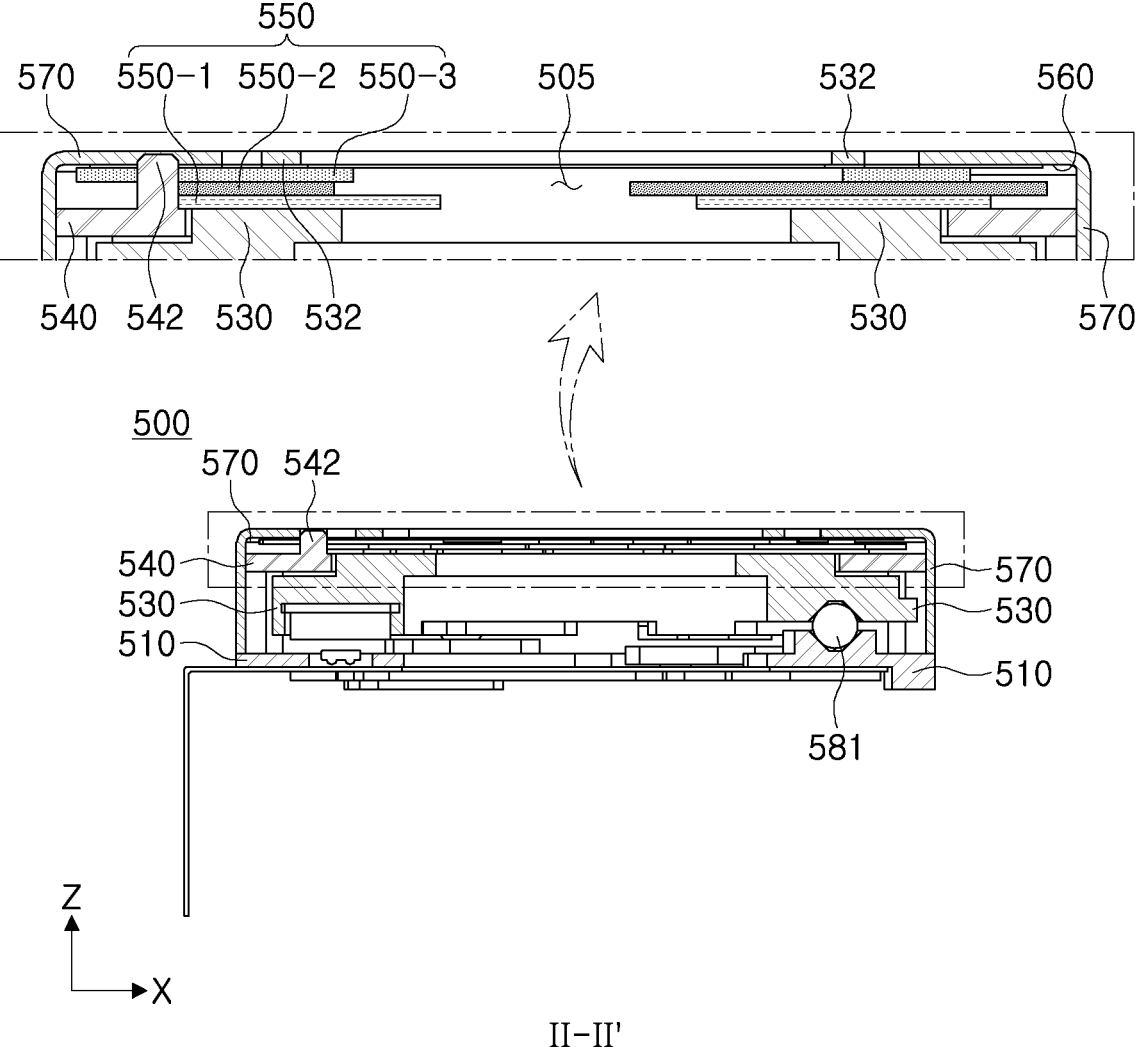
FIG. 7 illustrates a cross-sectional view taken along line II-II' of FIG. 4.

FIG. 4 is a perspective view of an aperture module, in accordance with one or more embodiments, FIG. 5 is an exploded perspective view of an aperture module, in accordance with one or more embodiments, FIG. 6 is an exploded perspective view from another direction in FIG. 5, and FIG. 7 is a cross-sectional view taken along line II-II' of FIG. 4.

Referring to FIGS. 4 to 6, the aperture module 500, in accordance with one or more embodiments, includes an aperture opening having an incidence hole 505 and an aperture driver 520 that changes the size of the incidence hole 505.

The aperture opening is a configuration including the incidence hole 505 through which light incident on the lens module 200 passes, and may include a base 510, a rotator 530 rotatably seated on the base 510, a ring plate 540 seated on the rotator 530 or the base 510 and coupled to the base 510, a plurality of blades 550 that rotate based on the rotation of the rotator 530 and forming the incidence hole 505, and an aperture cover 570 configured to cover the plurality of blades 550 at the upper portion in the optical axis direction.

Additionally, the aperture opening may further include an aperture spacer 560 disposed between the blade unit 550 and the aperture cover 570 to create a space therebetween.

The aperture opening may be disposed above the lens barrel 200 in the optical axis direction, for example, in front of the lens barrel 200 based on a path through which light is incident. The base 510, the rotator 530, the spacer 560, the plurality of blades 550, and the base cover 570 may be sequentially disposed in the optical axis direction.

At this time, a cover hole 575 provided in the aperture cover 570, a spacer hole 565 provided in the aperture spacer 560, a rotator hole 535 of the rotator 530, a plate hole 545 of the ring plate 540, and a base hole 515 provided in the base 510 may be disposed to at least partially overlap the incidence hole 505, based on the optical axis. By this structure, light having passed through the incidence hole 505 may be incident to the lens barrel 200.

The base 510 provides a space in which the rotator 530 is seated.

The base 510 is provided to be movable along with the lens module 200 in the direction of the optical axis, the first direction, and the second direction, such that the distance to the lens module 200 does not change during focusing operations and shake correction operations. Additionally, the base 510 may be provided so as not to move together with the lens module 200 for structural simplification.

For example, as long as the incidence hole 505 of the aperture opening may be disposed in front of the lens module 200 in the optical axis direction, the coupling position or method of the base 510 is not particularly limited.

The aperture cover 570 is provided to cover the plurality of blades 550 at an upper portion of the aperture module 500 in the optical axis direction, and may be combined with the base 510.

The rotator 530 may be provided in a ring shape having the rotator hole 535 in the center thereof, and may be rotatably provided on the base 510. The rotator 530 may be rotated based on the aperture driver 520 to be described later to rotate the plurality of blades 550, thereby changing the size of the incidence hole 505.

The ring plate 540 may be coupled to the base 510 on an upper portion of the base 510 in the optical axis direction. The ring plate 540 may be provided with a plurality of blade shafts 542 protruding upward in the optical axis direction, and may provide a rotation center for a plurality of blades 551 of the blade unit 550.

The blade unit 550 may include a plurality of blades 551. The plurality of blades 551 may be disposed in a circumferential direction around an axis parallel to the optical axis direction to form the incidence hole 505.

Referring to FIG. 5, FIG. 6, and FIG. 7, in the blade unit 550, a plurality of blades 551 may be disposed in a plurality of layers. By this structure, light leakage may be prevented and reliability may be improved.

The plurality of blades 551 may be arranged in a circumferential direction in the rotator 530, and surfaces facing the center of the plurality of blades may define the incidence hole 505. The size of the incidence hole 505 may be changed according to respective arrangement angles of the plurality of blades 551. For example, while the blade 551 is rotated by the rotation of the rotator 530, the size of the incidence hole 505 may be changed.

On the other hand, to improve image quality, the angle of the incidence hole 505 formed by the blade unit 550 may be, for example, an odd number.

In an example, when the blade unit 550 has an even number of blades 551 and the incidence hole 505 has an even number of sides, since respective sides on which diffraction occurs faces each other, the flare generated on the sides facing each other may overlap and the quality of the image may deteriorate.

On the other hand, for example, when the plurality of blades 551 of the blade unit 550 are provided in an odd number and the incidence hole 505 has an odd number of sides, since respective sides on which diffraction occurs are disposed to be staggered rather than facing each other, flares do not overlap each other and thus image quality deterioration caused by flares may be significantly reduced.

In this example, one blade 551 may form one angle of the incidence hole 505.

Thus, in an example, the total number of the plurality of blades 551 may be an odd number.

Accordingly, in an example, the blades 551 of the blade unit 550 may be disposed in an odd number of layers, and the blades 551 disposed in each layer may also be disposed in an odd number.

In an example, even if the blade unit 550 is provided in an even number of layers, an example in which the total number of the plurality of blades 551 is an odd number may be assumed by varying the number of blades 551 disposed in each layer.

In this example, the incidence hole may be formed at an odd number of angles, but the number of blades 551 should be different for respective layers. Thus, not only does it become structurally complex and the manufacturing costs may increase, but there is also a problem that the shape of the incidence hole is not stable.

Therefore, in accordance with one or more embodiments, in the blade unit 550, a plurality of blades 551 may be disposed in an odd number of layers in the optical axis direction, and in an example, the number of blades 551 disposed on each layer may be an odd number, not 1.

Accordingly, the total number of blades 551 is an odd number, such that the incidence hole 505 also has an odd number of angles.

In an example, in the blade unit 550, the plurality of blades 551 may be disposed in (2M−1) layers, and (2N+1) blades 551 may be provided in each layer, where M and N are positive integers and are defined as natural numbers.

In this example, as described above, for structural simplification, the numbers of blades 551 disposed on respective layers may be the same.

In an example, as illustrated in FIGS. 6 and 7, in the blade unit 550, the blades 551 are disposed in a first layer 550-1, a second layer 550-2, and a third layer 550-3, and, in the example, three blades 551 may be provided for each layer.

Additionally, at least a portion of the blades 551 disposed on different layers may overlap each other in the optical axis direction, while the blades 551 disposed on the same layer are disposed so as not to overlap each other in the optical axis direction.

By this structure, light may be prevented from leaking and an increase in the size of the aperture module 500 in the optical axis direction due to the arrangement of the blades 551 may be limited.

In an example, as illustrated in FIGS. 6 and 7, the blade 551 disposed on the first layer 550-1, the blade 551 disposed on the second layer 550-2, and the blade 551 disposed on the third layer 550-3 may overlap at least partially in the optical axis direction.

Additionally, the plurality of blades 551 disposed on the first layer 550-1, the plurality of blades 551 disposed on the second layer 550-2, or the plurality of blades 551 disposed on the third layer 550-3 may be disposed without overlapping each other in the optical axis direction.

In this example, "disposed on the same layer as each other" means "disposed on one virtual plane", and "disposed on different layers" means "disposed on a plurality of different virtual planes."

On the other hand, in an example in which the number of layers is one, when the incidence hole 505 is formed such that the plurality of blades 551 do not overlap each other, light may leak through a gap between a blade 551 and an adjacent blade 551 caused by an assembly tolerance.

In an example in which the number of layers is two, since the number of blades 551 may vary for respective layers, it may be structurally complex.

When the number of layers is three, the increase in the thickness of the aperture module 500 in the optical axis direction may be significantly reduced while the numbers of blades 551 in respective layers remain the same. Additionally, the incidence hole 505 formed by the plurality of blades 551 may have an odd number of angles.

In an example, with this structure, the incidence hole 505 may have an odd angle, and accordingly, three layers, which are the optimal number of layers, are provided, thereby reducing the height of the aperture module 500 itself and restricting an increase in size in the optical axis direction.

Therefore, the incidence hole 505 formed by the plurality of blades 550 of the blade unit 550 may have an odd number of angles.

On the other hand, in the above description and figures, it is illustrated that the blade unit 550 is provided with three layers (M=2) and three blades 551 may be disposed on each layer (N=1). However, the examples are not limited to a specific number as long as it satisfies the above-described relational expression.

Accordingly, through the above relationship, the aperture module 500, in accordance with one or more embodiments, may prevent image quality from deteriorating due to flare while limiting the increase in the size of the aperture module in the optical axis direction.

Figures 8A, 8B:
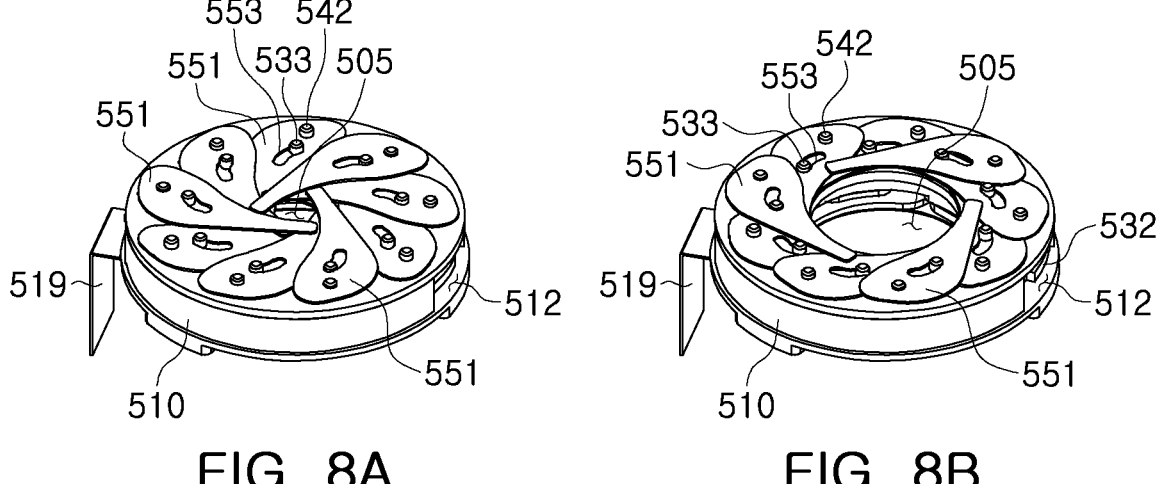
FIG. 8A and FIG. 8B are views illustrating the change in an incidence hole.

Additionally, when the rotator 530 rotates and the size of the incidence hole 505 changes, the overlapping area in the optical axis direction between the blades 551 disposed on different layers accordingly may change in proportion, as illustrated in FIGS. 8A and 8B.

In an example, as the size of the incidence hole 505 increases as the rotator 530 rotates, the overlapping area in the optical axis direction between the plurality of blades 551 disposed on different layers increases, and as the size of the incidence hole decreases, the overlapping area in the optical axis direction between the plurality of blades 511 disposed on different layers may decrease.

Additionally, as illustrated in FIGS. 5, 6 and 7, the plurality of blades 551 may be provided in various shapes, such as, but not limited to, a boomerang shape, a straight line, or the like, as long as they have a structure in which surfaces facing the center are combined to form the incidence hole 505.

In an example, the shape of the blade 551 is sufficient as long as the incidence hole 505 may be formed by arranging the plurality of blades 551. As illustrated in FIGS. 5, 6 and 7, the plurality of blades 551 may all have the same shape, but at least one of the plurality of blades 551 may have a shape different from the other blades 551.

Additionally, the shape of the plurality of blades 551 is not particularly limited as long as the planes facing the center form the incidence hole 505 while preventing overlap or interference in the optical axis direction between the blades 551 disposed on the same layer.

On the other hand, each of the blades 551 of the blade unit 550 may be provided with a blade hole 552 that accommodates the blade shaft 542 of a top ring plate 540, and a guide hole 553 that accommodates the guide shaft 533 of the rotator 530.

The blade shafts 542 may be spaced apart at predetermined intervals in the circumferential direction of the top ring plate 540. The blade shaft 542 may protrude upward from the top ring plate 540 in the optical axis direction, and may be accommodated in the blade hole 552. Since the top ring plate 540 may be coupled to the base 510 and may not rotate, the blade shaft 542 may provide a rotation axis when the plurality of blades 550 rotate. The blade shaft 542 may be formed as many as the number of the plurality of blades 551.

The guide shafts 533 may be spaced apart at predetermined intervals in the circumferential direction of the rotator 530. The guide shafts 533 may protrude upward from the rotator 533 in the optical axis direction, and may be inserted into the guide hole 553. The guide shafts 533 may be formed as many as the number of blades. At this time, the guide hole 553 that accommodates the guide shafts 533 may be provided in an oval shape or a slit shape to be guided by the guide shaft 533.

FIGS. 8A and 8B are views illustrating a change in the incidence hole. FIG. 8A illustrates a state in which the incidence hole 505 is minimally opened, and FIG. 8B illustrates a state in which the incidence hole is maximally opened.

Referring to FIGS. 8A and 8B, the rotator 530 may be rotated by the aperture driver 520. When the rotator 530 rotates, the plurality of blades 551 respectively rotate based on the guide shaft 532 inserted into the guide hole 552, using the blade shaft 542 as a rotation shaft. Accordingly, when the aperture driver 520 rotates the rotator 530, the plurality of blades 550 may also be driven to change the size of the incidence hole 505.

In an example, the plurality of blades 550 may be respectively rotated by the guide shaft 532 around the blade shaft 542, and at this time, the shape of the planes of the plurality of blades 550 facing the center may be changed such that the size of the incidence hole 505 may be changed.

On the other hand, as illustrated in FIGS. 8A and 8B, the side of the base 510 is recessed to provide a stopper that accommodates groove 512, and the rotator 530 may be provided with a stopper 532 that protrudes from an outer circumferential surface and is at least partially accommodated in the stopper accommodating groove 512.

Since the stopper 532 may be provided to move in the circumferential direction at predetermined intervals inside the stopper accommodating groove 512, excessive rotation of the rotator 530 out of the implementation range may be prevented.

Accordingly, the interval between the stopper accommodating grooves 512 may be formed in the position of the stopper 532 at which the incidence hole 505 is opened to the maximum and in the position of the stopper 532 at which the incidence hole is opened to the minimum.

The aperture driver 520 rotates the rotator 530 such that the size of the incidence hole 505 is changed. The aperture driver 520 rotates the rotator 530 to drive the blade unit 550, and therefore, the size of the incidence hole 505 may be changed.

The aperture driver 520 may include an aperture magnet 520a and an aperture coil 520b. The aperture magnet 520a and the aperture coil 520b may be disposed to face each other.

In this example, the aperture magnet 520a may be provided as a plurality of aperture magnets, and may be disposed on a virtual circle having a center O of the incidence hole 505 as a central circle. For example, the plurality of aperture magnets 520a may be disposed in a circumferential direction based on the center of the incidence hole 505 (see FIG. 9).

On the other hand, the aperture magnet 520a may be accommodated between the rotator 530 and the base 510, specifically, in a magnet accommodating groove 531 formed in the rotator 530. The aperture coil 520b may be provided on an aperture circuit board 519 disposed to face the lower surface of the rotator 530.

In an example, the aperture magnet 520a may be provided below the rotator 530 and may face the aperture coil 520b based on the optical axis direction.

In this example, the aperture magnet 520a may be a moving member accommodated in the rotator 530 and rotating together with the rotator 530, and the aperture coil 520b may be a fixed member that is provided on the aperture circuit board 519 and may not rotate together with the rotator 530.

Additionally, referring to FIG. 6, an aperture position sensor 521 is provided on the aperture circuit board 519 to sense the rotation angle of the rotator 530 and the like.

When power is applied to the aperture coil 520b, due to the electromagnetic influence between the aperture magnet 520a and the aperture coil 520b, the rotator 530 in which the aperture magnet 520a is accommodated may rotate based on an axis parallel to the optical axis direction.

On the other hand, the mounting positions of the aperture magnet 520a and the aperture coil 520b are not limited thereto as long as they have a structure that generates electromagnetic influence to rotate the rotator 530.

The aperture driver 520 may further include an aperture driving yoke 520c disposed to face the aperture magnet 520a and the aperture coil 520b. In an example, the aperture magnet 520a may be disposed between the aperture driving yoke 520c and the aperture coil 520b. By this structure, the aperture driving yoke 520c allows the magnetic force of the aperture magnet 520a to be focused, thereby preventing leakage magnetic flux from occurring.

Additionally, the aperture module 500, in accordance with one or more embodiments, may further include a pulling yoke 522 disposed to face the aperture driver 520.

The pulling yoke 522 may be provided below the base 510, and may be disposed to face the aperture driving yoke 520c, the aperture magnet 520a, and the aperture coil 520b. A rolling member 580 to be described later may be stably contacted between the rotator 530 and the base 510 by the attractive force between the pulling yoke 522 and the aperture magnet 520a.

Additionally, the pulling yoke 522 may focus the magnetic force of the aperture magnet 520a, such that leakage magnetic flux may be prevented from occurring. In an example, the pulling yoke 522 and the aperture magnet 520a may form a magnetic circuit.

The pulling yoke 522 may be provided with a yoke hole 525 communicating with the incidence hole 505, such that light incident through the incidence hole 505 may be incident to the lens barrel 200.

Additionally, the pulling yoke 522 may be provided with a yoke notch 524 that is recessed in the circumferential direction of the yoke hole 525. The yoke notch 524 may adjust a reluctance force that is generated between the aperture magnet 520a and the pulling yoke 522, such that, when current is not applied to the aperture coil 520b, the incidence hole 505 may maintain a preset initial state.

In an example, the yoke notch 524 may enable the position where the magnetic flux between the aperture magnet 520a and the pulling yoke 522 is maximized, to be the initial state of the incidence hole 505. In this example, the preset initial state of the incidence hole 505 may refer to a state in which the incidence hole 505 is minimally open (see FIG. 8A) or maximally open (see FIG. 8B).

Figures 9, 10:
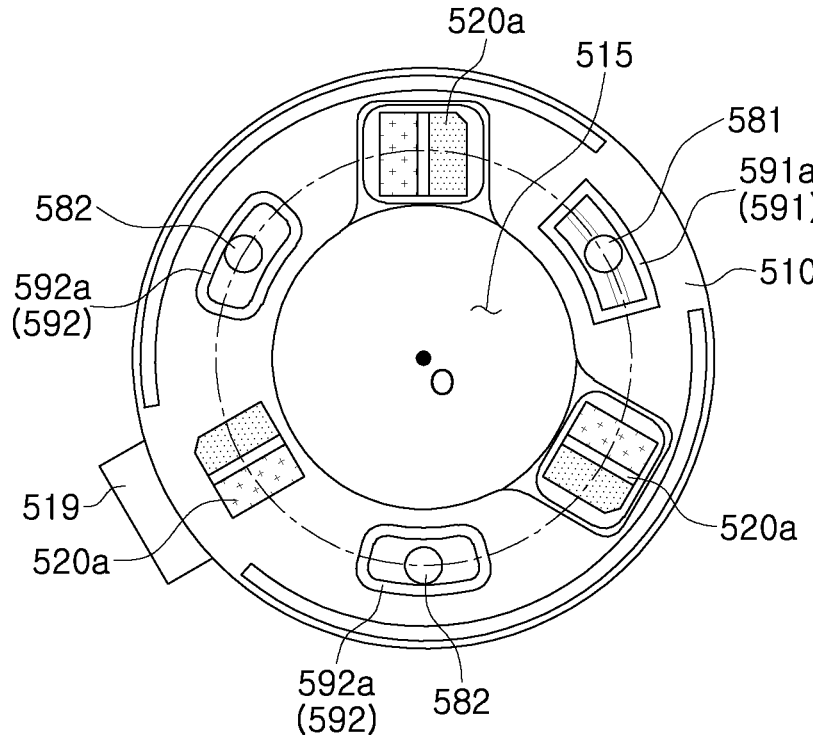
FIG. 9 illustrates a top view of a base on which a ball member and a rolling groove are disposed.
FIG. 10 illustrates a cross-sectional view of a main ball member and a main rolling groove.
Figure 11A:
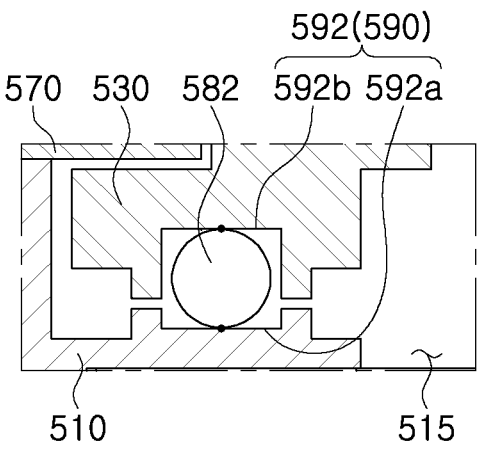
FIG. 11A and FIG. 11B illustrate cross-sectional views of a sub-ball member and a sub rolling groove.
Figure 11B:
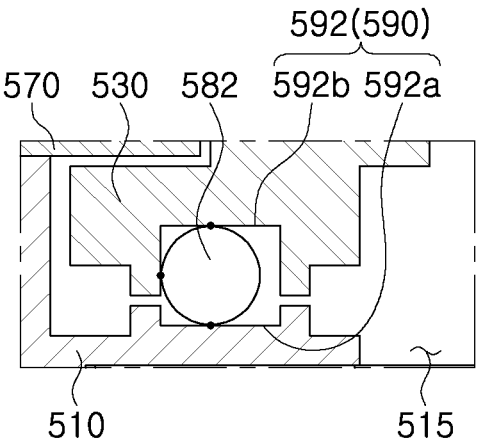

FIG. 9 illustrates a top view of the base on which the ball member and the rolling groove are disposed, and FIG. 10 is a cross-sectional view of the main ball member and the main rolling groove. FIG. 11A is a cross-sectional view of a sub-ball member and a sub rolling groove in a first state, and FIG. 11B is a cross-sectional view of the sub-ball member and the sub rolling groove in a second state.

Referring to FIGS. 9 to 11B together, the aperture module 500, in accordance with one or more embodiments, may include a ball member 580 (581, 582) disposed between the rotator 530 and the base 510 to support rotation of the rotator 530, and a rolling groove 590 that accommodates the ball member 580. Additionally, the aperture magnet 520a, the ball member 580, and the rolling groove 590 may be disposed on a virtual circle having the center O of the incidence hole 505 as a center point.

Specifically, between the base 510 and the rotator 530, the aperture magnet 520a, the ball member 580, and the rolling groove 590 may be disposed in the circumferential direction based on the center C of the incidence hole 505.

The ball member 580 may be provided as a plurality of ball members, specifically, at least three, between the rotator 530 and the base 510.

The rolling groove 590 may be provided to support the ball member 580 disposed between the rotator 530 and the base 510, and may be provided in the same number as the number of the ball members 580. The rolling groove 590 may extend in the circumferential direction, between the rotator 530 and the base 510, based on the center C of the incidence hole 505, to support the circumferential rolling motion of the ball member 580 according to the rotation of the rotator 530.

The rolling grooves 590 may be provided in the rotator 530 and the base 510, to face each other in the optical axis direction.

The rolling groove 590 includes a main rolling groove 591 provided to support the rolling motion of the main ball member 581 and a sub rolling groove 592 provided to support the rolling motion of the sub-ball member 582.

The main rolling groove 591 includes a first main rolling groove 591a provided on the base 510 to support the lower portion of the main ball member 581, and a first sub-rolling groove 591b facing the first main rolling groove 591a in the optical axis direction to support the upper portion of the main ball member 581.

The sub rolling groove 592 includes a first sub-rolling groove 592a provided on the base 510 to support the lower portion of the sub-ball member 582, and a second sub-rolling groove 592b facing the second sub-rolling groove 592a in the optical axis direction to support the upper portion of the sub-ball member 582.

As will be described later, the main rolling groove 591 is provided to contact the main ball member 581 at a total of four points (see FIG. 10), and the sub rolling groove 592 may contact the sub-ball member 582 at a total of 2 to 3 points. (See FIGS. 11A and 11B).

Accordingly, when the rolling groove 590 is provided as a plurality of rolling grooves, only one thereof may be the main rolling groove 591 and the rest may be sub rolling grooves 592 in consideration of assembly tolerance. In accordance with one or more embodiments, a total of three rolling grooves 590 may be provided (see FIG. 9), one of which is the main rolling groove 591 and the other two of which may be provided as the sub rolling grooves 592.

Referring to FIG. 10, the main ball member 581 may come into contact with the main rolling groove 591 at four points. The center point (not illustrated) of the ball member 581 may be disposed between the base 510 and the rotator 530.

The first main rolling groove 591a and the second main rolling groove 591b may be spaced apart at a predetermined angle based on an axis parallel to the optical axis direction and are provided to come into contact with the main ball member 582.

In an example, the first main rolling groove 591a and the second main rolling groove 591b of the main rolling groove 591 may be provided in a "rhombic" or "V" shape, and each of the first main rolling groove 591a and the second main rolling groove 591b may contact the main ball member 581 at two points. Therefore, the main rolling groove 591 not only supports the rolling motion of the main ball member 581, but also may guide the proper direction of the rolling motion.

On the other hand, the shape of the main rolling groove 591 is not limited to the above description, and may be provided variously.

Referring to FIG. 11, the sub-ball member 582 may be in contact with the sub rolling groove 592 at at least two points in consideration of assembly tolerances and the like in manufacturing. The first sub-rolling groove 592a and the second sub-rolling groove 592b of the sub-rolling groove 592 may be provided in a "⊏" shape, a "Π" shape, or a "quadrangular shape", to contact the sub-ball member 582 at 2 points or 3 points.

In an example in which the sub rolling groove 592 is in four-point contact with the ball member 580 like the main rolling groove 591, the ball member 580 may be stuck in the rolling groove 590 due to minute errors such as assembly tolerances or the like, and thus may not be able to rotate. Therefore, the contact point of the sub-ball member 592 may be smaller than a contact point of the main rolling groove 591.

By this structure, the sub rolling groove 592 may mainly support the rolling motion of the ball member 580, which is guided in the circumferential direction by the main rolling groove 591.

On the other hand, considering the operation of the sub rolling groove 592, the smaller the number of contact points between the sub-ball member 582 and the sub rolling groove 592, the better friction is reduced.

FIG. 11A is a view illustrating the arrangement of the sub rolling groove 592 and the sub-ball member 582 in the first state, and FIG. 11B is a view illustrating the arrangement of the sub rolling groove 592 and the sub-ball member 582 in the second state.

Referring to FIG. 11A, in the first state before the rotator 530 rotates, the sub-ball member 582 may be in two-point contact with the sub rolling groove 592. Referring to FIG. 11B, in the second state in which the rotator 530 is rotating, the sub-ball member 582 may move to the outside of the base hole 515 by centrifugal force. and may come into contact with the sub rolling groove 592 at three points.

In an example, by providing the sub-ball member 582 to move by a predetermined interval in the radial direction in the sub rolling groove 592, the sub-ball member 582 and the sub rolling groove 592 may be in two-point contact with each other for a predetermined time even when the rotator 530 rotates.

Thus, the sub-rolling groove 592 may have a length in the radial direction greater than the diameter of the sub-ball member 582 such that the sub-ball member 582 may also move in the radial direction by centrifugal force.

Therefore, the frictional force generated when the rotator 530 is initially driven may be effectively reduced.

Additionally, in the second state in which the rotator 530 is rotating, the sub rolling groove 592 and the sub-ball member 582 may contact at an interval of approximately 90 degrees based on an axis parallel to the optical axis, which is the rotational center of the rotator 530.

Specifically, the lower and upper portions of the sub-ball member 582 contact the first sub-rolling groove 592a provided on the base 510 and the first sub-rolling groove 592b provided on the rotator 530 at the interval of 180 degrees (parallel to the optical axis), respectively.

Additionally, the sub-ball member 582 may further contact either the first sub rolling groove 592a or the second sub rolling groove 592b at one point. In an example, the sub-ball member 582 may further contact the second sub-rolling groove 592b at one point, in a direction perpendicular to the optical axis, to contact at an interval of 90 degrees.

Accordingly, even in the example of three-point contact, contact is made at the interval of 90 degrees based on an axis parallel to the optical axis, and thus, the frictional force generated between the sub-ball member 582 and the sub rolling groove 592 may be significantly reduced.

At this time, the center point (not illustrated) of the sub-ball member 582 may be disposed inside the first sub rolling groove 592a or the second sub rolling groove 592b.

On the other hand, according to an embodiment, since the aperture magnet 520a is disposed horizontally on the base 510 (see FIG. 9), although it is advantageous to reduce the height of the aperture module 500, there is a restriction in increasing the size of the base hole 515 due to the area of the aperture magnet 520a itself.

If the size of the base hole 515 is relatively small, there may be restrictions on the aperture module 500 being provided in the camera module 100 depending on the diameter of the lens module 200. Additionally, if the size of the base hole 515 is small, there may be restrictions on increasing the amount of light incident to the lens module 200.

Figure 12:
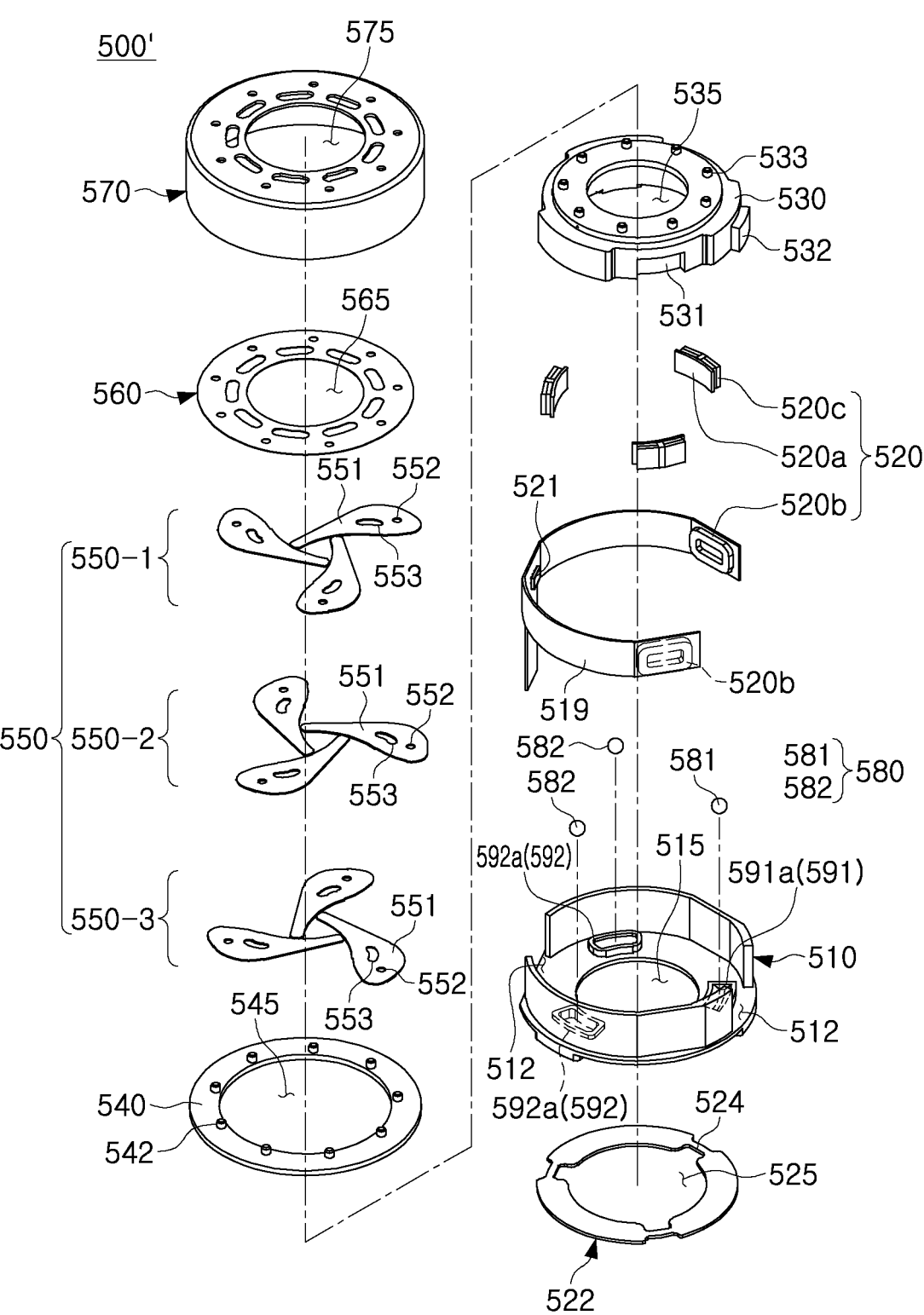
FIG. 12 illustrates an exploded perspective view of an example aperture module, in accordance with one or more embodiments.
Figure 13:
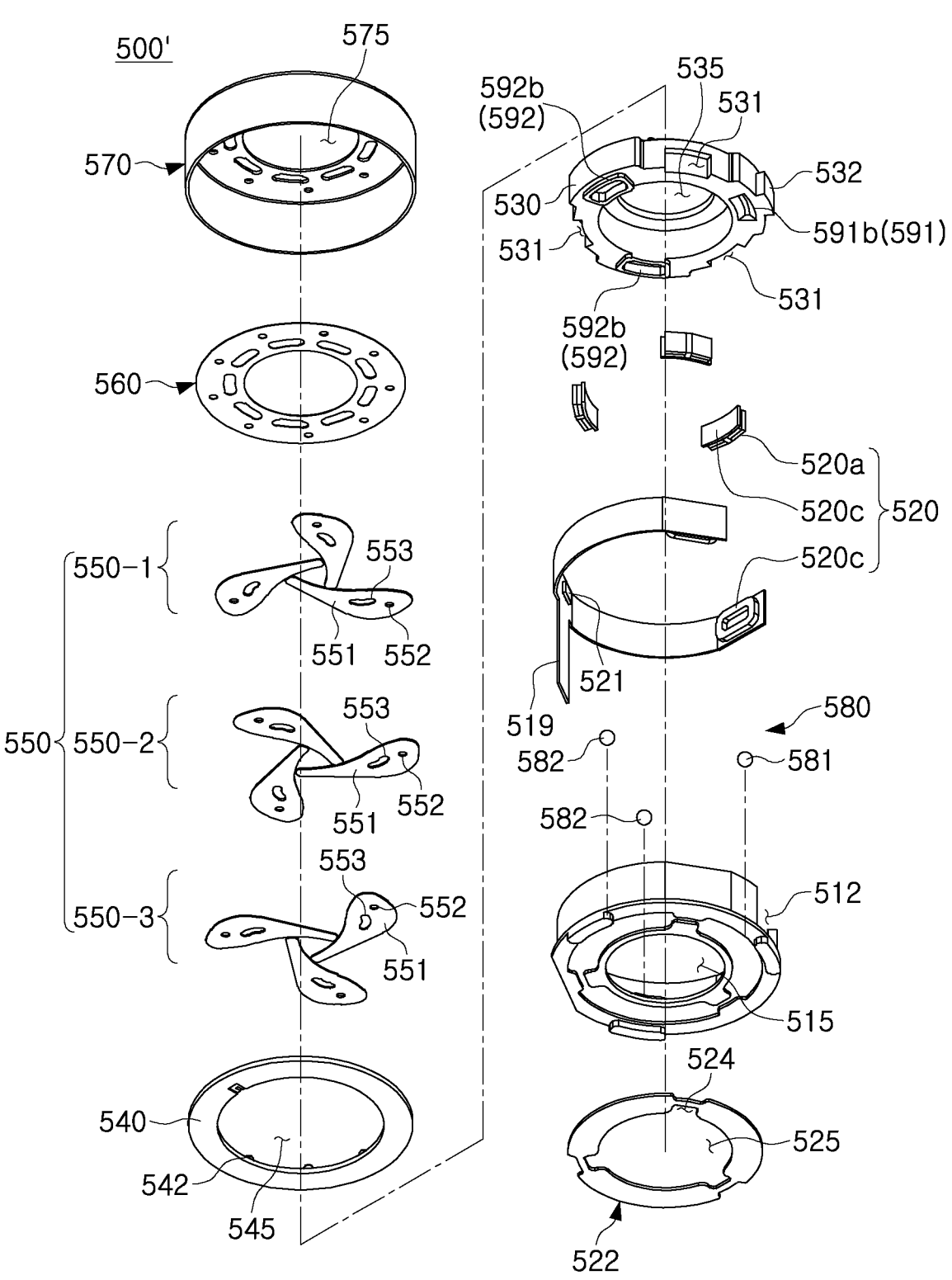
FIG. 13 illustrates an exploded perspective view of FIG. 12 viewed from another direction.
Figure 14:
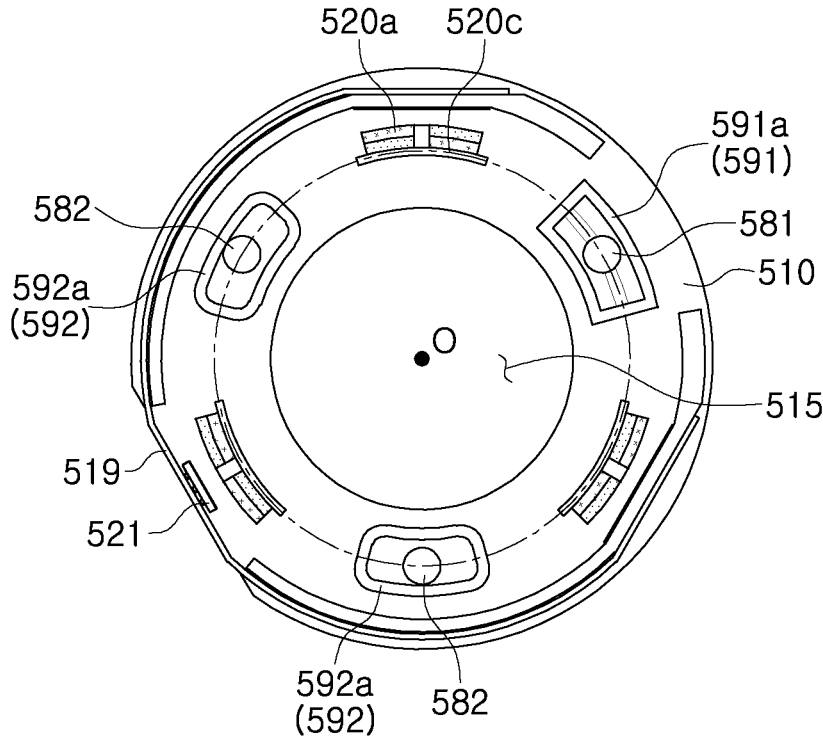
FIG. 14 illustrates a top view of a base on which a ball member and a rolling groove are disposed in an example aperture module, in accordance with one or more embodiments.

FIG. 12 illustrates an exploded perspective view of an aperture module, in accordance with one or more embodiments, FIG. 13 illustrates an exploded perspective view of FIG. 12 viewed in another direction, and FIG. 14 illustrates a top view of a base 510 on which a ball member 580 and a rolling groove 590 are disposed in an aperture module, in accordance with one or more embodiments.

In an aperture module 500', in accordance with one or more embodiments, an aperture magnet 520a may be provided in a vertically erected state.

In an example, the difference between the aperture module 500 according to a previous example embodiment and the aperture module 500' according to the current embodiment is the arrangement of the aperture magnet 520a and the relationship between a rotator 530 and an aperture circuit board 519 accordingly, and the other structure is the same thereas.

Hereinafter, the aperture module 500', in accordance with one or more embodiments, will be described focusing on the differences, and contents overlapping with the above description will be omitted.

Referring to FIGS. 12 and 13, the camera module 500', in accordance with one or more embodiments, is provided with a magnet accommodating groove 531 on the outer circumferential surface of the rotator 530, and the aperture magnet 520a is accommodated in the magnet accommodating groove 531. The aperture magnet 520a may be disposed on the side of the rotator 530 in an upright shape.

The aperture circuit board 519 may be provided to surround the base 510 from the side such that an aperture coil 520b faces the aperture magnet 520a.

In an example, the aperture magnet 520a is disposed between the side of the rotator 530 and the side of the base 510, and may face the aperture coil 520b in a direction perpendicular to the optical axis or in a radial direction.

In an example, the aperture magnet 520a is provided on the outer circumferential surface of the rotator 530 and may face the aperture coil 520b based on a direction perpendicular to the optical axis.

Referring to FIG. 14, the aperture magnet 520a may have a predetermined curvature in a circumferential direction from a center O of an incidence hole 505. Additionally, the aperture magnet 520a and the rolling groove 590 may be disposed on a virtual circle having the center O of the incidence hole 505 as a center point.

By this structure, the aperture module according to the previous embodiments is advantageous in increasing the size of the base hole 515 compared to the current embodiment. The base 510 is configured to face the lens barrel 200 and may allow a relatively greater amount of light to be incident to the lens of the lens barrel 200.

As set forth above, according to one or more embodiments, an aperture module in which image quality may be improved while significantly reducing an increase in thickness of an aperture, and a camera module including the same.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An aperture module, comprising:
a blade unit comprising a plurality of blades configured to form an incidence hole through which light passes, the plurality of blades being provided in (2M−1) layers in an optical axis direction, the plurality of blades disposed in each layer being provided in (2N+1) members, where M and N are natural numbers other than 0;
a rotator on which the plurality of blades are rotatably seated;
a base on which the rotator is seated;
a ball member disposed between the rotator and the base, and configured to rotatably support the rotator;
a rolling groove that extends in a direction of rotation of the rotator, and accommodates the ball member in a rolling motion; and
an aperture driver configured to rotate the rotator and change a size of the incidence hole,
wherein in the plurality of blades, blades disposed on different layers of the (2M−1) layers overlap at least partially in the optical axis direction, while blades disposed on a same layer of the (2M−1) layers do not overlap each other in the optical axis direction, and
wherein the ball member comprises a sub-ball member,
wherein the rolling groove comprises a sub rolling groove provided to contact the sub-ball member in at least two points, and
wherein a length of the sub rolling groove in a radial direction is greater than a diameter of the sub-ball member such that the sub-ball member is movable in the radial direction.

2. The aperture module of claim 1, wherein as the rotator rotates and the size of the incidence hole increases, an overlapping area between the blades disposed on the different layers of the (2M−1) layers increases, and as the size of the incidence hole decreases, the overlapping area between the blades disposed on different layers of the (2M−1) layers is reduced.

3. The aperture module of claim 1, wherein the incidence hole formed by the plurality of blades has an odd number of angles.

4. The aperture module of claim 1, wherein the rolling grooves are disposed to face each other in the optical axis direction in the rotator and the base.

5. The aperture module of claim 4, wherein the ball member comprises a main ball member, and
the rolling groove comprises a main rolling groove that is in contact with the main ball member at four points.

6. The aperture module of claim 5, wherein the main rolling groove comprises a first main rolling groove provided in the rotator and a second main rolling groove provided in the base to face the first main rolling groove, and
the first main rolling groove and the second main rolling groove are spaced apart from each other at a predetermined angle based on an axis parallel to the optical axis direction, and the main ball member contacts each of the first main rolling groove and the second main rolling groove at two points.

7. The aperture module of claim 6, wherein the first main rolling groove and the second main rolling groove are each provided in a "V" shape.

8. The aperture module of claim 5, wherein the sub-rolling groove comprises a first sub-rolling groove provided on the rotator and a second sub-rolling groove provided on the base to face the first sub-rolling groove, and
the sub-ball member contacts each of the first sub-rolling groove and the second sub-rolling groove at one point on an axis parallel to the optical axis direction.

9. The aperture module of claim 8, wherein the sub-ball member further contacts at one point with at least one of the first sub-rolling groove and the second sub-rolling groove on an axis parallel to a direction perpendicular to the optical axis direction.

10. The aperture module of claim 1,
wherein the aperture driver comprises:
an aperture magnet provided on the rotator to face the base; and
an aperture coil disposed on the base to face the aperture magnet,
wherein the aperture magnet is provided as a plurality of aperture magnets disposed in a circumferential direction based on a center of the incidence hole.

11. The aperture module of claim 10, wherein the aperture magnet is provided below the rotator, and is disposed between the rotator and the base, based on the optical axis direction.

12. The aperture module of claim 10, wherein the aperture magnet is provided on an outer circumferential surface of the rotator, and is disposed between the rotator and the base, based on a direction perpendicular to the optical axis direction.

13. A camera module, comprising:
a housing;
a lens barrel provided inside the housing and having a plurality of lenses disposed therein;
a fall detection sensor configured to measure an acceleration and generate a fall signal when a fall of the camera module is detected; and
an aperture module configured to control an amount of light incident on the lenses,
wherein the aperture module comprises:
a blade unit comprising a plurality of blades configured to form an incidence hole through which light passes, the plurality of blades being provided in (2M−1) layers in an optical axis direction, the plurality of blades disposed in each layer being provided in (2N+1) members, where M and N are natural numbers other than 0;
a rotator on which the plurality of blades are rotatably seated;
an aperture driver configured to change a size of the incidence hole by rotating the rotator; and
a controller configured to control the aperture driver and adjust the size of the incidence hole,
wherein in the blade unit, blades disposed on different layers of the (2M−1) layers overlap at least partially in the optical axis direction, and blades disposed on a same layer of the (2M−1) layers do not overlap each other in the optical axis direction,
wherein the aperture module has a fixed relative position in the optical axis direction with respect to the housing, and
wherein the controller is configured to open the incidence hole to a maximum size when the fall signal is generated.

14. The camera module of claim 13, further comprising an autofocus unit accommodated in relative motion in the optical axis direction with respect to the housing and the aperture module and having the lens barrel disposed therein, wherein the controller increases the size of the incidence hole when the autofocus unit moves upward with respect to the optical axis direction, and reduces the size of the incidence hole when the autofocus unit moves downward with respect to the optical axis direction.

* * * * *